US012603374B2

(12) United States Patent
Okano

(10) Patent No.: US 12,603,374 B2
(45) Date of Patent: Apr. 14, 2026

(54) BATTERY-MOUNTED VEHICLE

(71) Applicant: TOYOTA JIDOSHA KABUSHIKI KAISHA, Toyota (JP)

(72) Inventor: Masayuki Okano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 278 days.

(21) Appl. No.: 18/512,024

(22) Filed: Nov. 17, 2023

(65) Prior Publication Data

US 2024/0213610 A1 Jun. 27, 2024

(30) Foreign Application Priority Data

Dec. 26, 2022 (JP) .................................. 2022-208914

(51) Int. Cl.
H01M 50/249 (2021.01)
B60K 1/04 (2019.01)

(52) U.S. Cl.
CPC ............. H01M 50/249 (2021.01); B60K 1/04 (2013.01); *B60K 2001/0438* (2013.01); *H01M 2220/20* (2013.01)

(58) Field of Classification Search
CPC ............. B60K 1/04; B60K 2001/0438; H01M 50/249; H01M 2220/20
See application file for complete search history.

(56) References Cited

U.S. PATENT DOCUMENTS

2019/0047628 A1* 2/2019 Kawase ............. B62D 25/2036
2022/0227214 A1* 7/2022 Yaita ........................ B60K 1/04

FOREIGN PATENT DOCUMENTS

JP 2018-187973 A 11/2018

* cited by examiner

*Primary Examiner* — Lori Wu
(74) *Attorney, Agent, or Firm* — SOLARIS Intellectual Property Group, PLLC

(57) ABSTRACT

A battery-mounted vehicle includes a battery pack mounted at a vehicle lower side of a floor pan of a passenger compartment; a vehicle body frame member having a vertical wall that faces a peripheral wall of the battery pack in a vehicle horizontal direction with a gap therebetween; and an expansion chamber configured by at least one of an inner side concave portion that is formed at the peripheral wall of the battery pack or an outer side concave portion formed at the vertical wall of the vehicle body frame member, in a cross-sectional view viewed in the vehicle horizontal direction. The inner side concave portion is recessed toward an inner side, in the vehicle horizontal direction, of the battery pack, and the outer side concave portion is formed so as to be recessed toward an inner side, in the vehicle horizontal direction, of vehicle body frame member.

6 Claims, 5 Drawing Sheets

BATTERY-MOUNTED VEHICLE

CROSS-REFERENCE TO RELATED APPLICATIONS

This application claims priority under 35 USC 119 from Japanese Patent Application No. 2022-208914, filed Dec. 26, 2022, the disclosure of which is incorporated by reference herein in its entirety.

BACKGROUND

Technical Field

The present disclosure relates to a battery-mounted vehicle.

Related Art

A battery-mounted vehicle in which, in a configuration in which a battery pack is mounted at a lower side of a floor pan, noise entering into a passenger compartment from under a floor is reduced without an increase in mass or addition of members, has been conventionally known (refer to, for example, Japanese Patent Application Laid-Open No. (JP-A) 2018-187973). In this battery-mounted vehicle, a plurality of sound-absorbing through-holes are formed at a wall portion of the battery pack that faces a rocker with a gap therebetween, and the plurality of sound-absorbing through-holes communicate this gap with a lower space that is provided at an interior of the battery pack. Consequently, a portion of the noise under the floor of the passenger compartment, which passes through the gap toward a floor pan side, enters into the lower space through the sound-absorbing through-holes, and is absorbed according to the principle of a Helmholtz resonator.

SUMMARY

However, in a noise reduction measure using the principle of a Helmholtz resonator, only a sound absorption effect for a limited frequency band can be obtained. As a result, in a configuration in which a battery pack is mounted below a floor pan, there is still room for improvement in a structure that reduces noise entering into a passenger compartment from under the floor, which is of a wide frequency band range irrespective of the limited frequency band, without an increase in mass or addition of members.

In view of the above, the present disclosure provides a battery-mounted vehicle that can reduce noise in a wide frequency band range that enters into a passenger compartment from under the floor, without an increase in mass or addition of members, in a configuration in which a battery pack is mounted at a vehicle lower side of a floor pan.

A battery-mounted vehicle of a first aspect of the present disclosure includes: a battery pack that is mounted at a vehicle lower side of a floor pan of a passenger compartment; a vehicle body frame member that has a vertical wall facing a peripheral wall of the battery pack in a vehicle horizontal direction with a gap therebetween; and an expansion chamber that is configured by at least one of an inner side concave portion formed at the peripheral wall of the battery pack or an outer side concave portion formed at the vertical wall of the vehicle body frame member, in a cross-sectional view viewed in the vehicle horizontal direction. The inner side concave portion is recessed toward an inner side, in the vehicle horizontal direction, of the battery pack, and the outer side concave portion is recessed toward an inner side, in the vehicle horizontal direction, of the vehicle body frame member.

According to the battery-mounted vehicle of the first aspect, in the cross-sectional view viewed in the vehicle horizontal direction, the peripheral wall of the battery pack that is mounted at the vehicle lower side of the floor pan of the passenger compartment and the vertical wall of the vehicle body frame member face each other in the vehicle horizontal direction with a gap therebetween. Further, the expansion chamber is configured by at least one of an inner side concave portion formed at the peripheral wall of the battery pack or an outer side concave portion formed at the vertical wall of the vehicle body frame member. The inner side concave portion is recessed toward the inner side in the vehicle horizontal direction of the battery pack, and the outer side concave portion is recessed toward the inner side in the vehicle horizontal direction of the vehicle body frame member. In other words, the peripheral wall of the battery pack, the vertical wall of the vehicle body frame member, and the expansion chamber configure an expansion-type sound-muffling structure due to a change in a passage cross-sectional area. Therefore, noise (sound waves) in a wide frequency band range that enters into the passenger compartment from under the floor is muffled (attenuated) due to being reflected and interfered with at an interior of the expansion chamber. Consequently, according to the present disclosure, in the configuration in which the battery pack is mounted at the vehicle lower side of the floor pan, noise in a wide frequency band range that enters into the passenger compartment from under the floor is reduced without an increase in mass or addition of members.

Further, a battery-mounted vehicle of a second aspect of the present disclosure is the battery-mounted vehicle of the first aspect, wherein, in a cross-sectional view viewed in the vehicle horizontal direction, a first protruding portion that protrudes toward the vehicle lower side is formed at an upper edge portion of at least one of the inner side concave portion of the battery pack or the outer side concave portion of the vehicle body frame member.

According to the battery-mounted vehicle of the second aspect, in the cross-sectional view viewed in the vehicle horizontal direction, the first protruding portion that protrudes toward the vehicle lower side is formed at the upper edge portion of at least one of the inner side concave portion of the battery pack or the outer side concave portion of the vehicle body frame member. Therefore, noise (sound waves) in a wide frequency band range that enters into the passenger compartment from under the floor is muffled (attenuated) due to being more effectively reflected and interfered with at the interior of the expansion chamber into which the protruding portion is protruded. Consequently, noise in a wide frequency band range that enters into the passenger compartment from under the floor is further reduced.

Further, a battery-mounted vehicle of a third aspect of the present disclosure is the battery-mounted vehicle of the first aspect, wherein, in a cross-sectional view viewed in the vehicle horizontal direction, a second protruding portion that protrudes in the vehicle horizontal direction is formed at at least one of the inner side concave portion of the battery pack or the outer side concave portion of the vehicle body frame member.

According to the battery-mounted vehicle of the third aspect, in the cross-sectional view viewed in the vehicle horizontal direction, the second protruding portion that protrudes in the vehicle horizontal direction is formed at at least one of the inner side concave portion of the battery pack or the outer side concave portion of the vehicle body frame member. Therefore, noise (sound waves) in a wide frequency band range that enters into the passenger compartment from under the floor is muffled (attenuated) by being more effectively reflected and interfered with at the interior of the expansion chamber into which the second protruding portion is protruded. Consequently, noise in a wide frequency band range that enters into the passenger compartment from under the floor is further reduced.

Further, a battery-mounted vehicle of a fourth aspect of the present disclosure includes: a battery pack that is mounted at a vehicle lower side of a floor pan of a passenger compartment; a vehicle body frame member that has a vertical wall facing a peripheral wall of the battery pack in a vehicle horizontal direction with a gap therebetween; an inner side passage that is formed at the peripheral wall of the battery pack so as to divert toward an inner side of the battery pack, in a cross-sectional view viewed in the vehicle horizontal direction; and an outer side passage that is formed at the vertical wall of the vehicle body frame member so as to divert toward an inner side of the vehicle body frame member, in a cross-sectional view viewed in the vehicle horizontal direction, wherein the inner side passage and the outer side passage are offset in a vehicle up-down direction so as not to overlap with each other in the vehicle horizontal direction.

According to the battery-mounted vehicle of the fourth aspect, in the cross-sectional view viewed in the vehicle horizontal direction, the peripheral wall of the battery pack and the vertical wall of the vehicle body frame member face each other in the vehicle horizontal direction with a gap therebetween. Further, the inner side passage formed at the peripheral wall of the battery pack so as to divert toward the inner side of the battery pack and the outer side passage formed at the vertical wall of the vehicle body frame member so as to divert toward the inner side of the vehicle body frame member are offset in the vehicle up-down direction so as not to overlap with each other in the vehicle horizontal direction. Therefore, noise (sound waves) in a wide frequency band range that enters into the passenger compartment from under the floor is muffled (attenuated) by being interfered with, due to noise that has passed between the peripheral wall of the battery pack and the vertical wall of the vehicle body frame member and noise that has passed through the inner side passage and the outer side passage converging with each other. Consequently, according to the present disclosure, in the configuration in which the battery pack is mounted at the vehicle lower side of the floor pan, noise in a wide frequency band range that enters into the passenger compartment from under the floor is reduced without an increase in mass or addition of members.

A battery-mounted vehicle of a fifth aspect is the battery-mounted vehicle of the fourth aspect, wherein, the inner side passage includes a first lower inlet and a first upper outlet at the peripheral wall of the battery pack, the outer side passage includes a second lower inlet and a second upper outlet at the vertical wall of the vehicle body frame member, and positions of the first lower inlet and the first upper outlet of the inner side passage and positions of the second lower inlet and the second upper outlet of the outer side passage are deviated in the vehicle up-down direction such that the first lower inlet and the first upper outlet, and the second lower inlet and the second upper outlet do not face one another in the vehicle horizontal direction.

According to the battery-mounted vehicle of the fifth aspect, noise that has passed between the peripheral wall of the battery pack and the vertical wall of the vehicle body frame member and noise that has passed through the inner side passage and the outer side passage converge and is interfered with each other, and the noise is muffled (attenuated). Consequently, noise (sound waves) in a wide frequency band range that enters into the passenger compartment from under the floor is reduced without an increase in mass or addition of members.

As described above, according to the present disclosure, noise in a wide frequency band range that enters into a passenger compartment from under a floor can be reduced without an increase in mass or addition of members, in a configuration in which a battery pack is mounted at a vehicle lower side of a floor pan.

BRIEF DESCRIPTION OF THE DRAWINGS

Exemplary embodiments of the present disclosure will be described in detail based on the following FIGURES, wherein.

DETAILED DESCRIPTION

Figure 1:
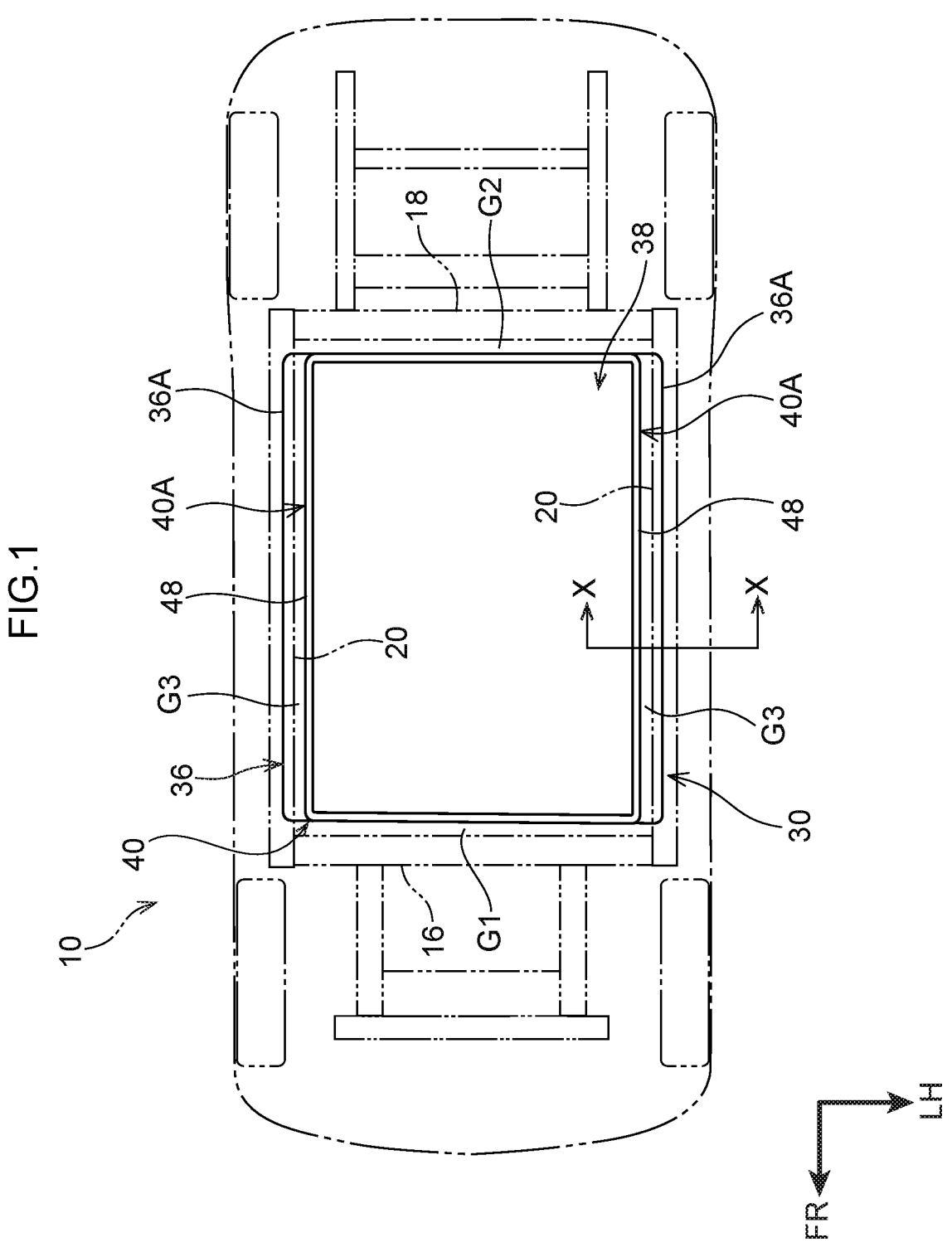
FIG. 1 is a schematic plan view illustrating a battery-mounted vehicle according to the present embodiments.

Hereinafter, exemplary embodiments of the present disclosure will be described in detail based on the drawings. It should be noted that, for convenience of explanation, arrow UP illustrated as appropriate in the drawings indicates a vehicle upward direction, arrow FR indicates a vehicle frontward direction, and arrow RH indicates a vehicle rightward direction. Therefore, in the following description, when up-down, front-rear, and left-right directions are described without special note, up-down, front-rear, and left-right directions of the vehicle are assumed to be indicated. Further, a direction orthogonal to the vehicle up-down direction is a vehicle horizontal direction, and the left-right direction has the same meaning as a vehicle width direction.

First Exemplary Embodiment

A first exemplary embodiment will be described. As shown in FIG. 1, in a battery-mounted vehicle 10 such as an electric vehicle or the like, a battery pack (battery unit) 30 is mounted at a lower side of a floor pan 14 (refer to FIG. 2) configuring a floor portion of a passenger compartment 12 (refer to FIG. 2). The battery pack 30 is formed in a flat substantially rectangular parallelepiped shape having a longitudinal direction in the front-rear direction, and is mounted across substantially an entire surface of the floor pan 14.

More specifically, a pair of left and right rockers 20 are arranged at vehicle width direction outer sides of the floor pan 14. A front cross member 16 having a rectangular closed cross-section shape extending in the vehicle width direction is provided bridging between front end portions of the left and right rockers 20, and a rear cross member 18 having a rectangular closed cross-section shape extending in the vehicle width direction is provided bridging between rear end portions of the left and right rockers 20. The battery pack 30 is arranged between the pair of left and right rockers 20 and between the front cross member 16 and the rear cross member 18.

In other words, the front cross member 16 faces the battery pack 30 from the front side with a gap G1 therebetween, the rear cross member 18 faces the battery pack 30 from the rear side with a gap G2 therebetween, and each of the left and right rockers 20 faces the battery pack 30 from the vehicle width direction outer side with a gap G3 therebetween. It should be noted that the front cross member 16, the rear cross member 18, and the pair of left and right rockers 20 are vehicle body frame members of the battery-mounted vehicle 10.

Each of the pair of left and right rockers 20 is formed in a substantially rectangular closed cross-sectional shape extending in the front-rear direction (with a longitudinal direction thereof in the front-rear direction), by extrusion molding of a light metal such as, for example, an aluminum alloy or the like. It should be noted that the rockers 20 are formed with bilaterally symmetrical shapes, and that the left-side rocker 20 is shown in FIG. 2.

Figure 2:
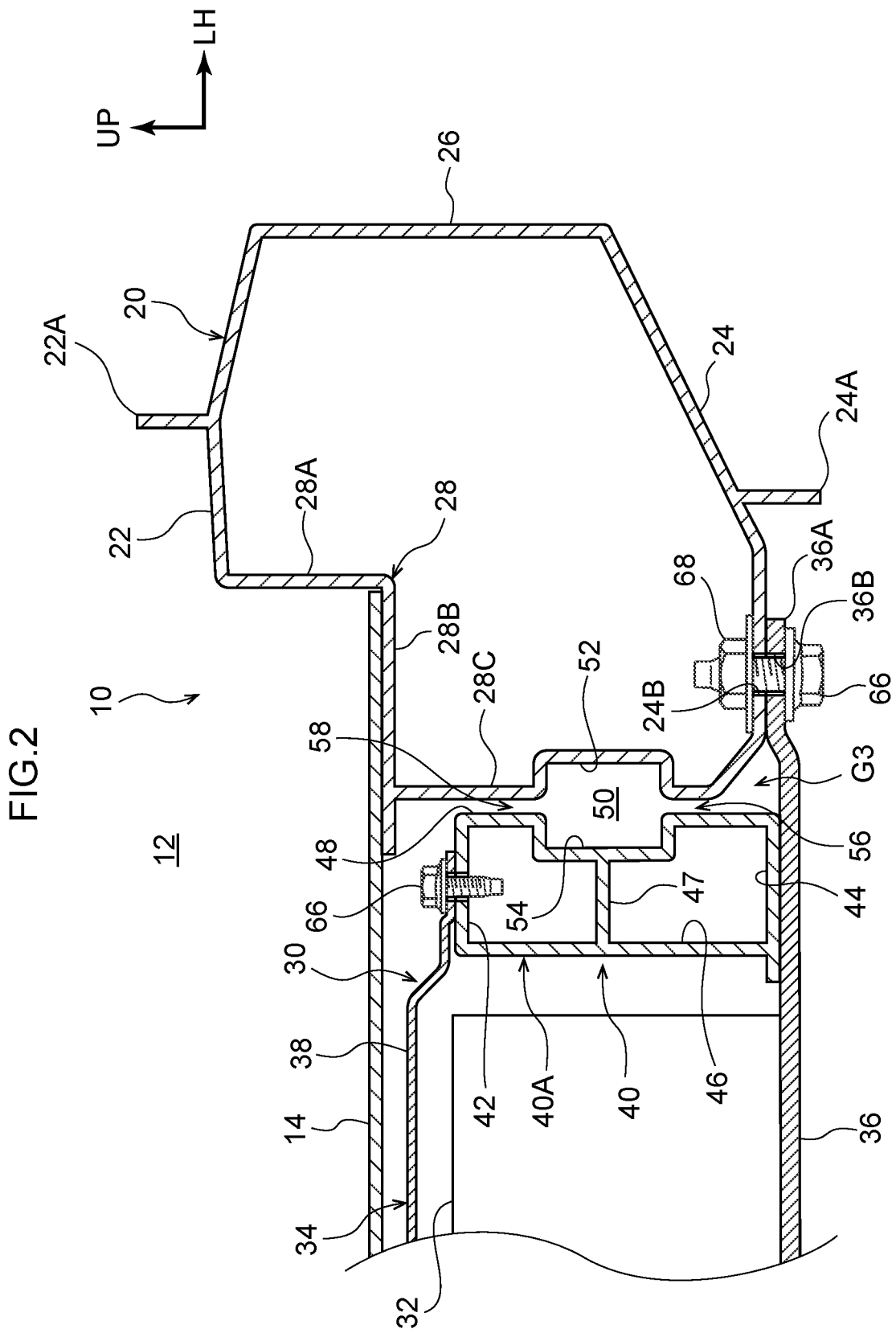
FIG. 2 is a schematic cross-sectional view taken along line X-X and viewed along the arrows in FIG. 1 and illustrating a first embodiment.

As shown in FIG. 2, the rocker 20 has an upper wall portion 22 and a lower wall portion 24 arranged to face each other in the up-down direction, an outer wall portion 26 that integrally connects vehicle width direction outer side end portions of the upper wall portion 22 and the lower wall portion 24 in the up-down direction, and an inner wall portion 28 that integrally connects vehicle width direction inner side end portions of the upper wall portion 22 and the lower wall portion 24 in the up-down direction.

A rectangular flat plate-shaped rib 22A that protrudes toward the upper side is integrally formed at a vicinity of a vehicle width direction central portion of the upper wall portion 22, and a rectangular flat plate-shaped rib 24A that protrudes toward the lower side is integrally formed at a vicinity of a vehicle width direction central portion of the lower wall portion 24. Each of the ribs 22A and 24A is configured to be used as a joining portion for joining with a peripheral part (such as a pillar or the like, which is not illustrated in the drawings). Further, the rib 22A at the upper side is configured to be used for attaching a weather strip, which is not illustrated in the drawings.

In the cross-sectional view viewed in the front-rear direction illustrated in FIG. 2, the outer wall portion 26 extends in the up-down direction, and the inner wall portion 28 is bent in a crank shape (step shape). In other words, the inner wall portion 28 is configured by an upper side vertical wall 28A extending downward from a vehicle width direction inner side end portion of the upper wall portion 22, an intermediate horizontal wall 28B extending toward the vehicle width direction inner side from a lower end portion of the upper side vertical wall 28A, and a lower side vertical wall 28C serving as a vertical wall extending downward from a vehicle width direction inner side end portion of the intermediate horizontal wall 28B.

The lower side vertical wall 28C is configured to face an outer side wall 48, which will be described later, of a peripheral wall 40 of the battery pack 30 with a gap G3 therebetween in the vehicle width direction (vehicle horizontal direction). An outer side concave portion 52, which is recessed in a substantially rectangular shape toward the vehicle width direction outer side (vehicle horizontal direction outer side) is formed at an up-down direction substantially central portion of the lower side vertical wall 28C in the cross-sectional view viewed in the front-rear direction (vehicle horizontal direction).

It should be noted that, although a lower end portion of the lower side vertical wall 28C is obliquely inclined and continuous with a vehicle width direction inner side end portion of the lower wall portion 24 in the cross-sectional view viewed in the front-rear direction, it may be bent substantially at a right angle and continuous with the vehicle width direction inner side end portion of the lower wall portion 24. Further, a length of the lower side vertical wall 28C along the up-down direction is set to be longer than a length of the upper side vertical wall 28A along the up-down direction. Furthermore, since the inner wall portion 28 is bent in the crank shape, a length of the upper wall portion 22 along the vehicle width direction is set to be shorter than a length of the lower wall portion 24 along the vehicle width direction.

A vehicle width direction outer side end portion of the floor pan 14 is superposed with an upper surface of the intermediate horizontal wall 28B of the inner wall portion 28. The floor pan 14 is formed by press-forming a plate material composed of, for example, the same light metal as the material of the rocker 20 (for example, an aluminum alloy), and is joined to the intermediate horizontal wall 28B by a joining means such as spot welding or the like. It should be noted that, in a case in which the floor pan 14 is formed of a plate material (for example, a steel plate) composed of a material that is different from the material of the rocker 20, it is joined to the intermediate horizontal wall 28B by a joining means such as a bolt and nut, rivet fastening or the like.

The battery pack 30 includes a battery case 34 formed in a substantially rectangular box shape which is flat in the up-down direction and has a longitudinal direction thereof in the front-rear direction, and plural battery modules 32 housed at an interior of the battery case 34. Each battery module 32 is configured by plural rectangular storage batteries. Further, the battery case 34 has a bottom plate 36 on which the plural battery modules 32 are mounted, a peripheral wall 40 provided to be erect at a peripheral edge portion of the bottom plate 36, and a top plate (lid) 38 whose peripheral edge portion is fastened to an upper wall portion 42, which will be described later, of the peripheral wall 40.

The bottom plate 36 is formed in a substantially rectangular flat plate shape having a longitudinal direction thereof in the front-rear direction, by press-forming a plate material composed of a light metal such as, for example, an aluminum alloy or the like, and is fixed by joining a lower surface of a lower wall portion 44, which will be described later, of the peripheral wall 40 to an upper surface of a peripheral edge portion of the bottom plate 36 by a joining means such as welding or the like. A pair of left and right fixing flange portions 36A that protrude further toward vehicle width direction outer sides than left and right side wall portions 40A, which will be described later, of the peripheral wall 40 (outer side wall 48) are integrally provided to extend from both vehicle width direction end portions of the bottom plate 36.

Each fixing flange portion 36A is superposed with a lower surface of the lower wall portion 24 of each rocker 20, and is fixed by being fastened by bolts 66 and weld nuts 68. Specifically, plural through-holes 36B are formed at each fixing flange portion 36A so as to be aligned in the front-rear direction. Then, at the lower wall portion 24 of the rocker 20, plural through holes 24B are formed so as to be aligned in the front-rear direction, and weld nuts 68 are provided so as to be coaxial with the respective through holes 24B.

Each fixing flange portion 36A has a configuration in which the bolts 66 are respectively inserted into the through-holes 36B and the through-holes 24B from the lower side and screwed into the weld nuts 68, whereby the fixing flange portion 36A is fixed by being joined to the respective rocker 20. In other words, the battery pack 30 (the battery case 34) is configured to be supported by the pair of left and right rockers 20.

The top plate 38 is formed in a substantially rectangular flat plate shape having a longitudinal direction thereof in the front rear direction by press-forming a plate material composed of a light metal such as, for example, an aluminum alloy or the like, and is fixed by a peripheral edge portion thereof being superposed with an upper surface of the upper wall portion 42, which will be described later, of the peripheral wall 40, and being fastened by plural bolts 66.

The peripheral wall 40 is configured by bending an elongated molded article formed by extrusion molding of a light metal such as, for example, an aluminum alloy or the like into a substantially rectangular frame shape and joining one end portion and another end portion thereof to each other, and is fixed by joining the lower surface of the lower wall portion 44, which will be described later, to the upper surface of the peripheral edge portion of the bottom plate 36 by welding or the like, as described above.

The peripheral wall 40 is formed substantially in a "B" shape in a cross-sectional view viewed in the front-rear direction. In other words, the peripheral wall 40 has an upper wall portion 42, a lower wall portion 44, an inner side wall 46, and an outer side wall 48, and a partition wall 47 is integrally provided, in parallel with the upper wall portion 42 and the lower wall portion 44, at up-down direction substantially intermediate portions of the inner side wall 46 and the outer side wall 48. The partition wall 47 is configured to partition (divide) an interior of the peripheral wall 40 into an upper space and a lower space.

An inner side concave portion 54 that is recessed in a substantially rectangular shape toward the vehicle width direction inner side is formed at an up-down direction substantially central portion of the outer side wall 48 in each of the pair of left and right side wall portions 40A of the peripheral wall 40, which face each other in the vehicle width direction, in a cross-sectional view viewed in the front-rear direction. In other words, a configuration is provided in which the outer side concave portion 52 formed at the lower side vertical wall 28C of the rocker and the inner side concave portion 54 formed at the outer side wall 48 of the peripheral wall 40 face each other in the vehicle width direction at the same height position, whereby an expansion chamber 50 having a substantially rectangular shape is formed in a cross-sectional view viewed in the front-rear direction.

It should be noted that, at a lower side and an upper side of the expansion chamber 50, a part configured by the lower side vertical wall 28C and the outer side wall 48, which face each other with the gap G3, has the function of communication pipes 56 and 58, which respectively communicate with the expansion chamber 50. In other words, the communication pipe 56, the expansion chamber 50, and the communication pipe 58 configure an expansion-type sound-muffling structure due to a change in a passage cross-sectional area.

Here, a theoretical expression for a noise reduction amount R is shown for a case in which a cross-sectional area of the expansion chamber 50 in the horizontal direction is designated as S, a cross-sectional area of the communication pipes 56 and 58 in the horizontal direction is designated as S0, a length of the expansion chamber 50 along the up-down direction is designated L, a frequency is designated as f, and the speed of sound is designated as c. If S/S0=m and $2\pi f/c=k$, the following theoretical expression is obtained.

$$R = 10 \times \log\left(1 + \left((m - 1/m)^2 \sin^2 kL\right)/4\right)$$

Next, operation of the battery-mounted vehicle 10 according to the first exemplary embodiment configured as described above will be described.

As shown in FIG. 2, in a cross-sectional view viewed in the front-rear direction, the lower side vertical wall 28C of the rocker 20 and the outer side wall 48 of the battery case 34 face each other in the vehicle width direction with the gap G3 therebetween. Then, due to the outer side concave portion 52 formed at the lower side vertical wall 28C and the inner side concave portion 54 formed at the outer side wall 48 facing each other in the vehicle width direction at the same height position, the expansion chamber 50 is formed, the space between the lower side vertical wall 28C and the outer side wall 48 at the lower side of the expansion chamber 50 is configured as the communication pipe 56, and the space between the lower side vertical wall 28C and the outer side wall 48 at the upper side of the expansion chamber 50 is configured as the communication pipe 58.

In other words, as described above, the communication pipe 56, the expansion chamber 50, and the communication pipe 58 form an expansion-type sound-muffling structure due to the change in the passage cross-sectional area. Therefore, noise (sound waves) in a wide frequency band range (irrespective of a limited frequency band) that enters into the passenger compartment 12 from under the floor through the communication pipe 56, such as road noise, wind noise and the like, is muffled (attenuated) by being reflected and interfered with at the interior of the expansion chamber 50 provided part way along the entry path of the noise.

Consequently, in the configuration in which the battery pack 30 is mounted at the lower side of the floor pan 14, noise in a wide frequency band range that enters into the passenger compartment 12 from under the floor can be reduced without an increase in mass or addition of members (seal parts or the like that suppress or prevent transmission of noise), and comfort in the passenger compartment 12 can be improved. Further, as compared with a case involving an increase in mass or the addition of members, an increase in manufacturing cost can be avoided.

Furthermore, by forming the outer side concave portion 52 at the lower side vertical wall 28C of the rocker 20, a so-called bead shape is formed at the lower side vertical wall 28C. Therefore, a rigidity of the lower side vertical wall 28C can be improved, and occurrence of cross-sectional deformation of the rocker 20 at the time of a collision can be suppressed. Further, since through-holes for sound absorption are not formed at the outer side wall 48 of the peripheral wall 40, there is no possibility that moisture will enter into the interior of the peripheral wall 40, and there is no possibility that rust (corrosion) will occur at an interior of the battery pack 30.

First Modified Example

Figure 3:
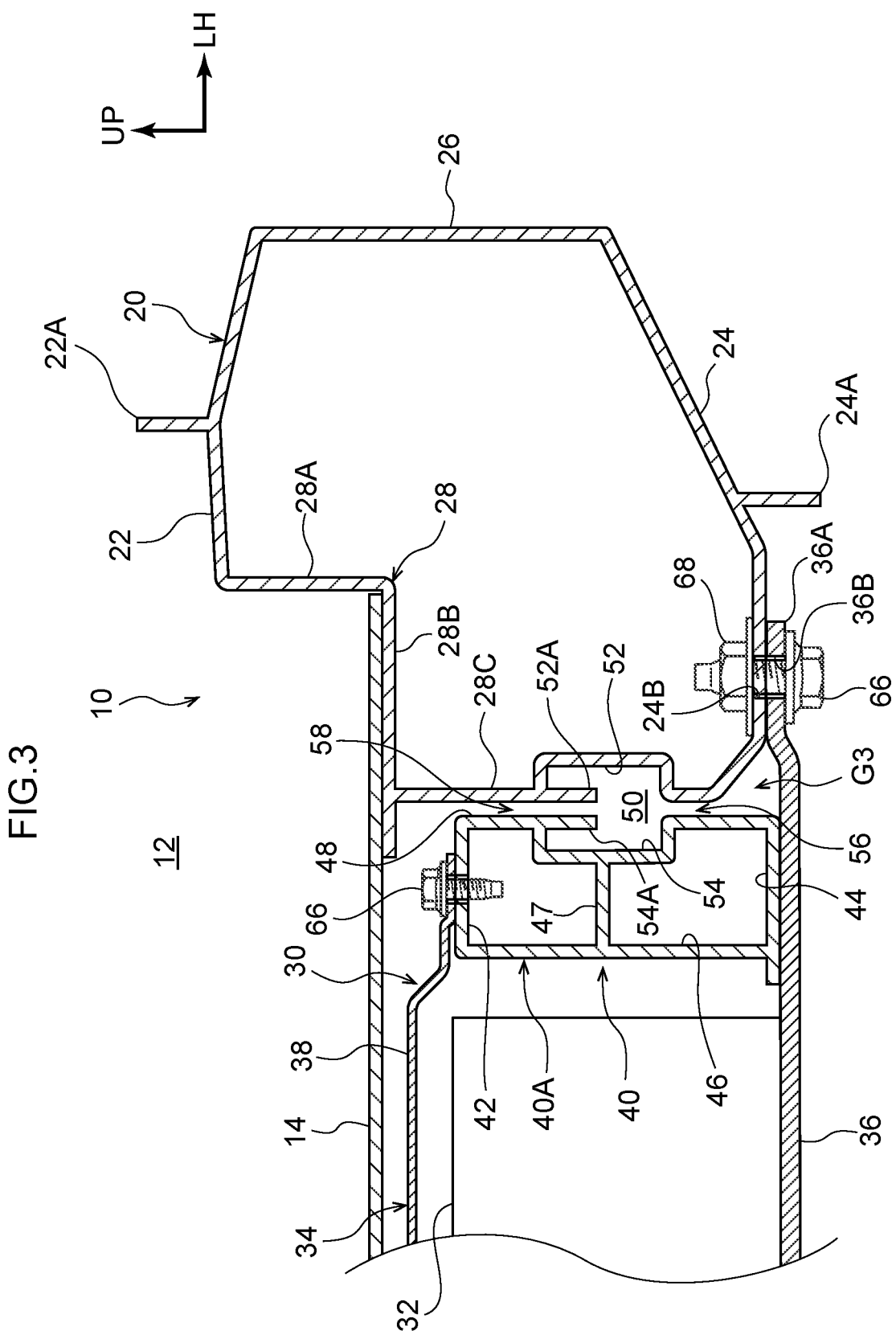
FIG. 3 is a schematic cross-sectional view taken along line X-X and viewed along the arrows in FIG. 1 and illustrating a first modified example of the first embodiment.

It should be noted that the shape of the expansion chamber 50 is not limited to the shape illustrated in FIG. 2. The shape of the expansion chamber 50 may be, for example, the shape illustrated in FIG. 3. In other words, in a cross-sectional view viewed in the front-rear direction, a protruding portion 52A that protrudes toward the lower side (into the expansion chamber 50) may be integrally formed at an upper edge portion of the outer side concave portion 52, and a protruding portion 54A that protrudes toward the lower side (into the expansion chamber 50) may be integrally formed at an upper edge portion of the inner side concave portion 54 (a so-called muffler structure may be adopted).

When such a protruding portion 52A and a protruding portion 54A are formed, noise (sound waves) in a wide frequency band range (irrespective of a limited frequency band) that enters from under the floor through the communication pipe 56 can be more effectively reflected and interfered with at the interior of the expansion chamber 50 into which the protruding portion 52A and the protruding portion 54A are protruded, and the noise is muffled (attenuated). Thus, noise in a wide frequency band range that enters into the passenger compartment 12 from under the floor can be further reduced.

Second Modified Example

Figure 4:
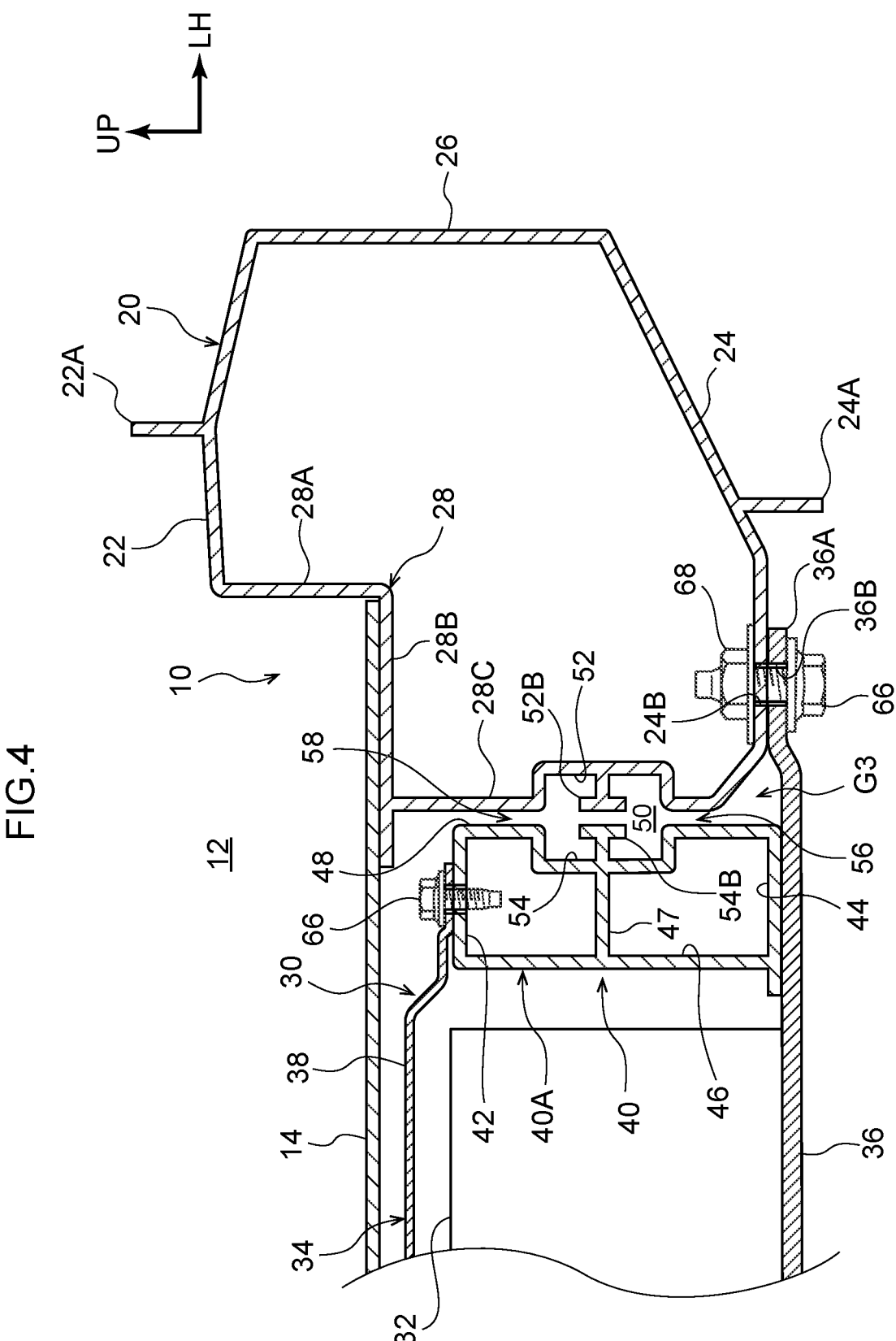
FIG. 4 is a schematic cross-sectional view taken along line X-X and viewed along the arrows in FIG. 1 and illustrating a second modified example of the first embodiment.

Furthermore, the shape of the expansion chamber 50 may be, for example, the shape illustrated in FIG. 4. In other words, in a cross-sectional view viewed in the front-rear direction, a substantially "T"-shaped protruding portion 52B that protrudes toward the vehicle width direction inner side (into the expansion chamber 50) may be integrally formed at an up-down direction substantially central portion of a base surface at a vehicle width direction outer side of the outer side concave portion 52, and a substantially "T"-shaped protruding portion 54B that protrudes toward the vehicle width direction outer side (into the expansion chamber 50) may be integrally formed at an up-down direction substantially central portion of a base surface at a vehicle width direction inner side of the inner side concave portion 54 (a so-called muffler structure may be adopted).

When such a protruding portion 52B and a protruding portion 54B are formed, noise (sound waves) in a wide frequency band range (irrespective of a limited frequency band) that enters from under the floor through the communication pipe 56 can be more effectively reflected and interfered with at the interior of the expansion chamber 50 into which the protruding portion 52B and the protruding portion 54B are protruded, and the noise is muffled (attenuated). Thus, noise in a wide frequency band range that enters into the passenger compartment 12 from under the floor can be further reduced.

Second Exemplary Embodiment

A second exemplary embodiment will be described. It should be noted that parts that are equivalent to those in the first exemplary embodiment are denoted by the same reference numerals, and a detailed description (including the common operation) thereof will be appropriately omitted.

Figure 5:
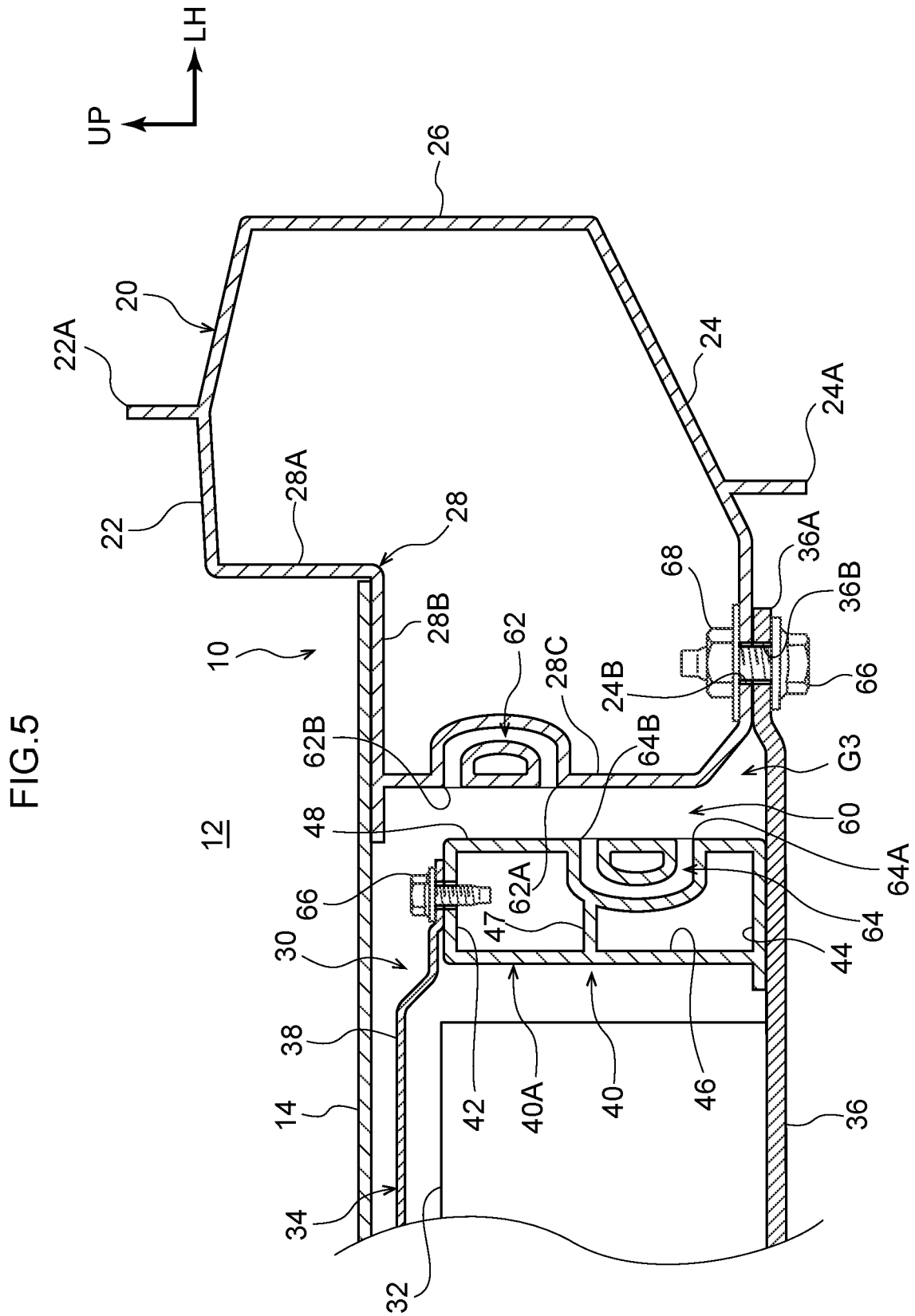
FIG. 5 is a schematic cross-sectional view taken along line X-X and viewed along the arrows in FIG. 1 and illustrating a second embodiment.

In the second exemplary embodiment, as illustrated in FIG. 5, in a cross-sectional view viewed in the front-rear direction, a passage 60 is configured between the lower side vertical wall 28C and the outer side wall 48, and separately from the passage 60, an outer side passage 62 that diverts toward the vehicle width direction outer side is formed at the lower side vertical wall 28C, and an inner side passage 64 that diverts toward the vehicle width direction inner side is formed at the outer side wall 48. Further, the outer side passage 62 and the inner side passage 64 are offset in the up-down direction so as not to overlap with each other in a front view and a side view.

Specifically, the outer side passage 62 is formed at an upper portion of the lower side vertical wall 28C, and a lower inlet 62A and an upper outlet 62B of the outer side passage 62 are configured so as to face an upper portion of the outer side wall 48 in the vehicle width direction. Further, the inner side passage 64 is formed at a lower portion of the outer side wall 48, and a lower inlet 64A and an upper outlet 64B of the inner side passage 64 are configured so as to face a lower portion of the lower side vertical wall 28C in the vehicle width direction. In other words, the upper outlet 64B of the inner side passage 64 and the lower inlet 62A of the outer side passage 62 are configured so as to be offset in the up-down direction and not face each other.

As a result, sound waves that have entered into the passage 60 from the lower side (from under the floor) branch and also enter into the inner side passage 64 from the lower inlet 64A, and when the sound waves that have branched exit from the upper outlet 64B into the passage 60, they are interfered with by converging with sound waves coming through the passage 60 and are muffled (attenuated). Furthermore, the sound waves coming through the passage 60 branch and also enter into the outer side passage 62 from the lower inlet 62A, and when the sound waves that have branched exit from the upper outlet 62B into the passage 60, they are interfered with by converging with the sound waves coming through the passage 60, and are muffled (attenuated).

In other words, in the second exemplary embodiment, an interference-type sound-muffling structure is configured in which sound waves of opposite phases due to propagation path differences interfere with each other and are muffled, and noise (sound waves) in a wide frequency band range (irrespective of a limited frequency band) that enters from under the floor through the passage 60, such as road noise, wind noise and the like, is interfered with and muffled (attenuated) due to passing through the passage 60, the inner side passage 64, and the outer side passage 62. Therefore, in the configuration in which the battery pack 30 is mounted at the lower side of the floor pan 14, noise in a wide frequency band range that enters into the passenger compartment 12 from under the floor can be reduced without an increase in mass or addition of members, and comfort in the passenger compartment 12 can be improved.

Although the battery-mounted vehicle 10 according to the present exemplary embodiments has been described above based on the drawings, the battery-mounted vehicle 10 according to the present exemplary embodiments is not limited to that which is illustrated in the drawings, and design modification can be appropriately carried out within a scope that does not depart from the gist of the present disclosure. For example, the rocker 20 is not limited to a configuration in which it is formed by extrusion molding.

Further, the expansion chamber 50 may be configured by at least one of the outer side concave portion 52 formed at the lower side vertical wall 28C of the rocker 20 or the inner side concave portion 54 formed at the outer side wall 48 of the side wall portion 40A. Furthermore, the outer side concave portion 52 and the outer side passage 62 may be formed at a rear wall, serving as a vertical wall, of the front cross member 16 and at a front wall, serving as a vertical wall, of the rear cross member 18, instead of at the lower side vertical wall 28C of each rocker 20, respectively. In this case, the inner side concave portion 54 and the inner side passage 64 are formed at the outer side wall 48 at a front wall portion of the peripheral wall 40 and at the outer side wall 48 at a rear wall portion of the peripheral wall 40, respectively.

What is claimed is:

1. A battery-mounted vehicle comprising:

a battery pack mounted at a vehicle lower side of a floor pan of a passenger compartment;

a vehicle body frame member having a vertical wall that faces a peripheral wall of the battery pack in a vehicle horizontal direction with a gap therebetween; and an expansion chamber configured by at least one of an inner side concave portion that is formed at the peripheral wall of the battery pack or an outer side concave portion formed at the vertical wall of the vehicle body frame member, in a cross-sectional view viewed in the vehicle horizontal direction, the inner side concave portion being recessed toward an inner side, in the vehicle horizontal direction, of the battery pack, and the outer side concave portion being formed so as to be recessed toward an inner side, in the vehicle horizontal direction, of the vehicle body frame member, wherein the inner side concave portion is formed by bending the peripheral wall of the battery pack horizontally inwardly in a vehicle width direction, further bending vertically upwardly, and bending horizontally outwardly in the vehicle width direction, and wherein the outer side concave portion is formed by bending the vertical wall of the vehicle body frame member horizontally outwardly in the vehicle width direction, further bending vertically upwardly, and bending horizontally inwardly in the vehicle width direction.

2. The battery-mounted vehicle according to claim 1, wherein, in a cross-sectional view viewed in the vehicle horizontal direction, a first protruding portion that protrudes toward the vehicle lower side is formed at an upper edge portion of at least one of the inner side concave portion of the battery pack or the outer side concave portion of the vehicle body frame member.

3. The battery-mounted vehicle according to claim 1, wherein, in a cross-sectional view viewed in the vehicle horizontal direction, a second protruding portion that protrudes in the vehicle horizontal direction toward an inner side of the expansion chamber is formed at at least one of the inner side concave portion of the battery pack or the outer side concave portion of the vehicle body frame member.

4. The battery-mounted vehicle according to claim 1, wherein a common expansion chamber is configured by the inner side concave portion and the outer side concave portion.

5. A battery-mounted vehicle comprising:

a battery pack mounted at a vehicle lower side of a floor pan of a passenger compartment;

a vehicle body frame member having a vertical wall that faces a peripheral wall of the battery pack in a vehicle horizontal direction with a gap therebetween;

an inner side passage formed at the peripheral wall of the battery pack so as to divert toward an inner side of the battery pack in a cross-sectional view viewed in the vehicle horizontal direction; and an outer side passage formed at the vertical wall of the vehicle body frame member so as to divert toward an inner side of the vehicle body frame member in a cross-sectional view viewed in the vehicle horizontal direction, wherein the inner side passage and the outer side passage are offset in a vehicle up-down direction so as not to overlap with each other in the vehicle horizontal direction.

6. The battery-mounted vehicle according to claim 5, wherein:

the inner side passage comprises a first lower inlet and a first upper outlet at the peripheral wall of the battery pack, the outer side passage comprises a second lower inlet and a second upper outlet at the vertical wall of the vehicle body frame member, and positions of the first lower inlet and the first upper outlet of the inner side passage and the second lower inlet and the second upper outlet of the outer side passage are deviated in the vehicle up-down direction such that the first lower inlet and the first upper outlet, and the second lower inlet and the second upper outlet do not face one another in the vehicle horizontal direction.

\* \* \* \* \*